Figure 1:
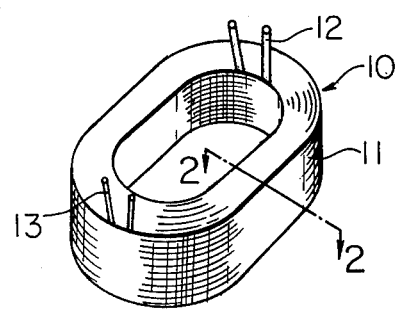

United States Patent [19]

Akao et al.

[11] 3,914,467

[45] Oct. 21, 1975

[54] METHOD OF MAKING RESIN ENCAPSULATED ELECTRIC COIL

[75] Inventors: Masatake Akao; Kazuo Yamashita, both of Kadoma, Japan

[73] Assignee: Matsushita Electric Industrial Company Limited, Kadoma, Japan

[22] Filed: Apr. 25, 1974

[21] Appl. No.: 464,194

Related U.S. Application Data

[63] Continuation-in-part of Ser. No. 265,297, June 22, 1972, abandoned.

[30] Foreign Application Priority Data

June 22, 1971 Japan................................. 46-45495
June 22, 1971 Japan................................. 46-45496
June 22, 1971 Japan................................. 46-45497

[52] U.S. Cl. ................ 427/116; 427/295; 427/374; 427/379; 427/435
[51] Int. Cl.²....................... B05D 5/12; B05D 3/02
[58] Field of Search.... 117/232, 113, 161 B, 161 K, 117/119; 427/116, 295, 374, 379, 435

[56] References Cited

UNITED STATES PATENTS

| | | | |
|---|---|---|---|
| 2,442,183 | 5/1948 | Stearns | 117/232 X |
| 3,068,533 | 12/1962 | Raimondi | 117/232 UX |
| 3,196,297 | 7/1965 | Kaeding | 117/232 X |
| 3,531,321 | 9/1970 | Batzer et al. | 117/232 |
| 3,698,937 | 10/1972 | Hoffman | 117/113 |
| 3,801,392 | 4/1974 | Scheel et al. | 117/232 X |

*Primary Examiner*—Harry J. Gwinnell

[57] ABSTRACT

A gelling agent such as dibenzylidene-D-sorbitol is admixed with a low viscosity epoxy or unsaturated polyester resin in addition to a usual curing agent for the resin to cause the resin to reversibly turn into the form of gel at a desired moment by adjustment of the resin temperature. Coils are immersed in the resin mixture when it lies in the form of sol, and the resin impregnating and covering the coils is quickly turned into gel before the step of heat-curing to prevent the draining of the resin from the coils.

8 Claims, 4 Drawing Figures

METHOD OF MAKING RESIN ENCAPSULATED ELECTRIC COIL

This application is a continuation-in-part of Ser. No. 265,297 filed June 22, 1972 now abandoned.

The present invention relates to a method of impregnating and encapsulating electric coils with a heat-hardenable liquid resin.

Electric coils, particularly electromagnet coils made up of multi-layer windings such as for transformers, motors, solenoids and the like, are usually impregnated and covered with an artificial resin to enhance insulation between the windings and to protect them against external forces and moisture. A low-viscosity resin is commonly employed for such purpose, under vacuum in most cases, to avoid occluding air within the windings and resin, or to prevent resulting breakdown of insulation. As a result, the coils are placed and kept in a metal mould either individually or several together during soaking in the resin and subsequent heat curing in conventional methods for the impregnation so that the resin may not drain away from the coils before completion of hardening.

Such conventional methods involve little problem from the viewpoint of the products quality, but the use of metal moulds is inevitably accompanied with miscellaneous troubles, which lead to low efficiency in mass production and high production costs. First of all, considerable hands are required to assemble and disassemble the coils with the moulds and to keep the moulds in proper condition for use, for example, by applying a removing agent on their surface to prevent adhesion of the hardened resin. Then, a number of moulds are required for production of a kind of coil because a cycle of the impregnation and curing occupies considerably long hours. In addition, a variety of moulds must be prepared for production of various coils, and most of them become useless when the coils receive design modification.

The resin draining may possibly be precluded by the employment of a resin having a high viscosity either inherently or by the aid of a certain filler, but a voidless resin impregnation cannot be expected in such a case. As is described before, the air occlusion should be strictly avoided to secure insulation especially for high voltage coils.

It is therefore an object of the present invention to provide an efficient method of impregnating and encapsulating an electric oil with a liquid resin capable of being hardened by heat, which method requires no mould to prevent draining-off of the resin from the coil. Briefly stated, according to a method of the invention, a liquid thermosetting resin is admixed with a gelling agent for organic liquid materials in addition to a conventional curing agent for the resin, and the resin mixture is quickly turned into the form of gel by temperature adjustment of the mixture at a desired moment after immersion of an electric coil in the liquid resin mixture and before commencement of heat curing of the resin-soaked coil. A typical and preferred gelling agent is dibenzylidene-D-sorbitol. The coil is heat cured in the usual way after withdrawal from the resin bath without draining-off of the attached resin because the gelled resin does not revert into the form of sol unless the temperature is raised beyond a range in which the curing agent effectively works to harden the resin.

Figure 2:
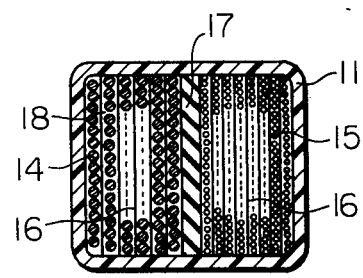
Figure 3:
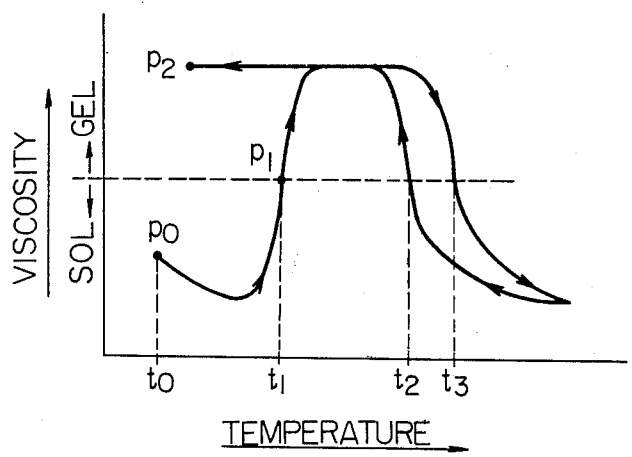
Figure 4:
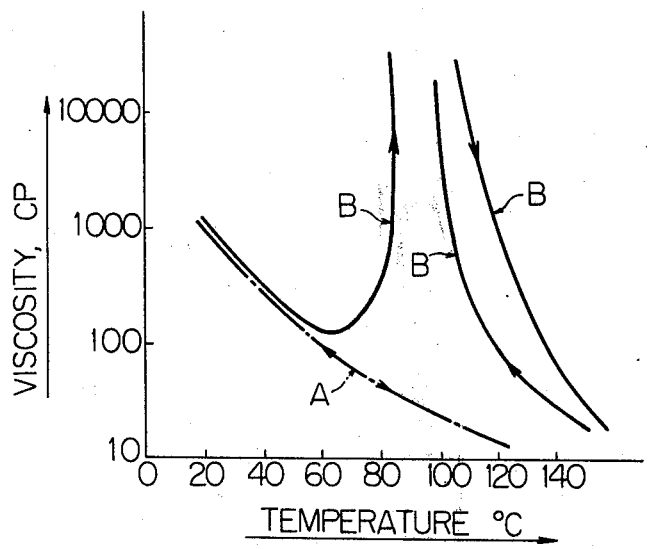

Other features and advantages of the invention will be more clearly understood from the following detailed description when taken in conjunction with the accompanying drawings, in which:

FIG. 1 is a perspective view of an electromagnet coil;
FIG. 2 is a sectional view of the same coil taken along the line 2—2 of FIG. 1;
FIG. 3 is a graph showing the relationship between the temperature and viscosity of a resin containing a gelling agent; and
FIG. 4 is a similar graph showing the effect of a gelling agent admixed with an epoxy resin.

FIG. 1 shows an electromagnet coil 10 which is entirely covered or encapsulated with a relatively thick insulation coating 11 of a hardened resin except for pairs of leads 12 and 13. As shown sectionally in FIG. 2, the coil 10 includes a group of multi-layer windings 14 of insulated conductive wire for low voltage current and another group 15 for high voltage. Layer insulators 16 of thin paper prevent each layer of the windings 14 and 15 from being in direct contact with adjacent layers, and a thicker barrier 17 parts the two groups 14 and 15. Spaces 18 between wire turns 14, 15, insulating paper 16 and the barrier 17 are filled or impregnated with the same resin (not shown) as the exterior coating 11. The coil 10 may be partially wrapped around with a suitable tape (not shown) under the coating 11, or before the resin impregnation for prevention of deformation.

A method of the invention is naturally applicable to any type of electric coil other than the illustrated one. For example, a coil may have only a group of windings for high voltage.

Most of liquid thermosetting resins commonly used in the art of electric coil insulation are suitable to a method of the invention. Examples are epoxy resins, polyesters, polyurethanes, etc., and solventless epoxy resins and unsaturated polyester resins are preferred among them like in conventional methods. Curing agents for the respective resins are selected from a number of conventional curing agents taking into consideration the lower limit of the effective temperature range.

As an essential feature of the invention, a gelling agent is added to the selected resin, which gelling agent is utterly different from the above curing agents. There are certain powder substances which can cause various organic liquid materials to turn into gel when dissolved in the liquid not by a chemical reaction with the liquid but possibly by physical "coagulation" of the molecules.

The action of dibenzylidene-D-sorbitol, which is a typical and preferred example of such substances, on a liquid resin will now be explained with reference to FIG. 3. Crystalline powder of the gelling agent is mixed with a liquid resin at $P_0$ when the liquid temperature is $t_0$, which may usually be room temperature. The gelling agent in the resin remains crystalline at this temperature, and there occurs substantially no change in the viscosity of the resin. When the liquid temperature is raised, the viscosity lowers gradually until the gelling agent dissolves in the resin at $t_1$. A sharp increase in the viscosity accompanies the dissolution, and the liquid resin turns into the form of gel at $p_1$ where the viscosity reaches the order of $10^4$ cp. Finally, the resin loses fluidity and becomes a gelatinous semi-solid. Thereafter, the resin lies in the form of semi-solid gel until the temperature is further raised up to $t_3$. The gel begins to revert into sol at $t_3$, and the effect of the gelling agent completely disappears above this temperature, so that the viscosity becomes extemely low due to the elevated temperature. If the temperature is then decreased to $t_3$, the resin still lies in the sol form. At $t_2$, however, the sol again turns into gel or semi-solid in the same manner as in the range $t_1$ to $t_3$ during the initial temperature increase, and further temperature reduction, even beyond $t_1$, has no effect on the gelled resin. It is very interesting and important that the above sol-gel-sol change is reversible. The resin can be solated when heated up to $t_3$ after the resin comes to $p_2$ through one or repeated cycles.

FIG. 4 is a graphical representation of viscosity values as a function of liquid temperature obtained for a bisphenol A type epoxy resin. No curing agent was added, and the curves A and B represent the pure resin and a mixture with 1% by weight of dibenzylidene-D-sorbitol, respectively. The curve B is generally similar to the curve of FIG. 3 although the uppermost viscosity portion of the former is omitted due to practical impossibility of determining the viscosity exactly. When the mixture of the resin and the gelling agent is heated from room temperature, the mixture shows a gradual viscosity decrease until the temperature reaches about 60°C. The viscosity, however, begins to increase greatly and the mixture into gel when the temperature exceeds 70°C as represented by the extreme left portion of the curve B. As the temperature is further increased, the mixture remains in the gelled state until it begins to revert into sol at a temperature slightly above 100°C as represented by the extreme right portion of the curve B. If the resulting hot sol is cooled thereafter, the mixture gels again along the central portion of the curve B. It will be understood that the gelation by the gelling agent occurs at a temperature considerably lower than a range in which many curing agents work effectively and that the viscosity can be lowered sufficiently either before the gelation or after the solation at higher temperatures even when the gelling agent is used. Furthermore, the gelation by the action of the gelling agent is accomplished very quickly at either $t_1$ or $t_3$ of FIG. 3. In most cases, it takes only about one minute at most to form a semi-solid gel, which is out of comparison with several hours of heating time for hardening by the action of a curing agent.

In a first preferred embodiment of the invention, one or a plurality of electric coils are directly immersed in a liquid thermosetting resin containing a curing agent and a few percent by weight of gelling agent keeping the resin temperature at such a moderate value that the viscosity of the resin is adequately lowered and the gelling agent is yet undissolved. To accomplish voidless resin impregnation, the immersion is preferably carried out under vacuum. Then, the resin is heated to a temperature to dissolve the gelling agent, but not to cause the curing agent to effectively work. The coils are removed from the resin bath when the gelation comes to completion, and are then heated at a temperature high enough to allow the curing agent to work, but not enough to cause the gelled resin to solate. The temperature may be further raised after the resin is half cured.

This method features simplicity of the procedure besides the use of no mould and suits for manufacture of a number of relatively small coils.

According to another embodiment of the invention, the coils are immersed in the resin similarly to the first embodiment. The coils are withdrawn from the resin without further heating, and are soon placed into a high temperature atmosphere to cause the gelling agent in the attached resin to dissolve and to cause the resin, at least the surface region thereof, to gel quickly. After completion of the gelation, curing of the coils or the attached resin is carried out in the same way as the first embodiment.

Since the resin is never gelled within a bath according to this embodiment, immersion of many coils can be carried out consecutively.

In a third embodiment of the invention, a resin containing a gelling agent is heated, before immersion of the coils, above a temperature at which the once gelled resin reverts into the form of a low viscosity sol. A curing agent may be admixed with the resin before the heating, but is preferably introduced after the temperature of the solated resin is somewhat reduced, preferably below the solation point ($t_3$ of FIG. 3) to avoid premature hardening of the resin. Then, the coils are immersed in the resin sol preferably under vacuum, while the resin temperature is kept unchanged. After withdrawal from the resin, the coils are soon cooled below a temperature at which the solated resin again turns into gel. The gelation rapidly proceeds from the surface of the exterior resin coating into the interior resin. After that, heat curing is carried out in agreement with the previous embodiments.

This method is advantageous because of an extremely low resin viscosity at the time of the coil immersion and very quick gelation of the resin coating surface.

The curing agents in the above embodiments are selected from those which commence to work effectively at a temperature above $t_1$, preferably above $t_2$, and below $t_3$.

No mould is required throughout the above embodiments since the resin impregnating and covering the coil lies always in the gel form when the coil is heated to cure the resin. On the other hand, the coil is always immersed in a low viscosity resin sol. Consequently, almost no air is occluded in the interior of the coil or in the insulating resin.

It is the most remarkable advantage of a method of the invention that elimination of moulds and avoidance of air occlusion are simultaneously accomplished.

The following examples are presented to further illustrate the invention, but not by way of limitation.

EXAMPLE 1

An electromagnet coil essentially consisting of windings of 1 mm diameter insulated copper wire formed generally oval in shape and about 300 mm long per turn was impregnated and encapsulated with a bisphenol A type epoxy resin, which was Epicoat-828 produced by Shell Chemicals Ltd.

To 100 g of the resin in an impregnation bath, 2 g of boron tri-fluoride monoethylamine as a curing agent and 1.5 g of dibenzylidene-D-sorbitol (commercially available from New Japan Chemical Ltd.) as a gelling agent were admixed. The resin mixture was heated to about 70°C to lower the viscosity to about 200 cp. The coil was immersed in the mixture at this temperature and under vacuum of 0.1 mm Hg. Then, the bath temperature was raised to about 90°C to dissolve the gelling agent, and the liquid mixture turned into a semi-solid gel having a hardness of about 10–20 on Shore scale within about 60 sec. The coil was removed from the bath and was heated in a constant temperature oven maintained at 100°C for 16 hr to harden the attached resin. The half-cured resin impregnating and covering the coil was after-cured at about 200°C for 2 hr to give a resin insulated coil having a rigid resin coating of about 6 mm thick.

EXAMPLE 2

The same coil as in Example 1 was used, and the similar resin mixture was prepared except that the gelling agent was increased to 2 g. The immersion of the coil was carried out at 70°C and under vacuum of 0.1 mm Hg. The coil was withdrawn from the bath without further elevation of the bath temperature. Soon the coil was placed into a 100°C oven to dissolve the gelling agent. The surface region of the attached resin turned into a gelatinous gel having a hardness of 15–20 on Shore scale in less than 30 sec, so that no draining of the resin enclosed in the coil was observed. After that, curing was carried out in the similar way to Example 1.

EXAMPLE 3

8 g of the same gelling agent was mixed with 100 g of the same epoxy resin with no curing agent, and the bath temperature was gradually increased. The resin mixture turned into gel at about 70°C and reverted into sol at about 110°C. The solated resin mixture was able to lie in the sol form until the temperature was reduced to about 70°C. Thereafter, the bath was kept at about 80°C. Then, 2 g of the curing agent of Example 1 was added to the mixture, of which viscosity was about 150 cp. The coil of Example 1 was immersed into the liquid mixture under vacuum of 0.1 mm Hg. After withdrawal from the liquid, the coil was soon placed into a chamber maintained at about 50°C to allow the attached resin to gel quickly. The hardness of the resulting gel was about 15–25 on Shore scale. The coil was subsequently subjected to heat-curing for 16 hr at about 100°C and for further 2 hr at about 200°C.

EXAMPLE 4

A mixture of 100 g of the epoxy resin and 5 g of the gelling agent was heated similarly to Example 3. The mixture gelled at about 70°C and became sol at about 120°C. The sol form was able to exist at temperatures above 80°C. The bath temperature was kept at about 90°C, and 3 g of 2-ethyl-4-methyl imidazole was added as a curing agent. The solated mixture showed a viscosity of about 70 cp at 90°C. The impregnation of the coil and the gelation out of the resin bath were carried out in the same manner as in Example 3. The gelled resin on the coil was cured at about 100°C for 24 hr and then at about 180°C for 5 hr.

EXAMPLE 5

An unsaturated polyester resin composed of maleic anhydride, adipic acid and propylene glycol and containing about 35% by weight of vinyltoluene as a cross-linking monomer was used. 100 g of the resin was mixed with 1 g of the gelling agent of Example 1 and 2 g of methyl ethyl ketone peroxide as an initiator for the cross-linking reaction. The viscosity of the resin mixture at 30°C was about 450 cp. The coil was immersed in the mixture at this temperature and under vacuum of 0.1 mm Hg. The resin mixture was then heated to about 60°C to dissolve the gelling agent and to turn into a gelatinous gel in less than 60 sec. The coil was withdrawn from the bath and was cured at about 80°C for 10 hr followed by after-curing at about 150°C for 2 hr. The solation temperature of the gelled mixture was observed to be about 105°C.

What is claimed is:

1. A method of impregnating and encapsulating an electric coil with a liquid thermosetting resin for enhancement of insulation and protection against external forces, comprising the steps of:

preparing a mixture of 100 parts by weight of a liquid thermosetting resin selected from the group consisting of epoxy resins and unsaturated polyester resins, a curing agent capable of curing the resin at a temperature range between about 80°C and about 200°C and about 1 to about 2 parts by weight of powdered dibenzylidene-D-sorbitol;

heating the mixture to a first temperature between room temperature and about 70°C thereby to lower the viscosity of the resin;

immersing an electric coil in the mixture under vacuum, maintaining the mixture at said first temperature;

heating the mixture to a second temperature higher than said first temperature and between about 60°C and about 90°C thereby to dissolve dibenzylidene-D-sorbitol in the resin and cause the mixture to gel within about 1 minute;

withdrawing the coil from the gelled mixture;

heating the withdrawn coil at a third temperature higher than said second temperature and between about 80°C and about 100°C thereby to half-cure the resin while maintaining the mixture attached to the coil in the gelled state; and heating the coil at a temperature higher than 100°C thereby to complete the curing of the resin.

2. A method as claimed in claim 1, wherein said resin and said curing agent are a bisphenol A type epoxy resin and boron trifluoride monoethylamine, respectively, the amount of said curing agent being about 2 parts by weight.

3. A method as claimed in claim 1, wherein said resin and said curing agent are an unsaturated polyester resin and methylethyl ketone peroxide, respectively, the amount of said curing agent being about 1 part by weight.

4. A method of impregnating and encapsulating an electric coil with a liquid thermosetting resin for enhancement of insulation and protection against external forces, comprising the steps of:

preparing a mixture of 100 parts by weight of a liquid thermosetting resin selected from the group consisting of epoxy resins and unsaturated polyester resins, a curing agent capable of curing the resin at a temperature range between about 80°C and about 200°C and about 1 to about 2 parts by weight of powdered dibenzylidene-D-sorbitol;

heating the mixture to a first temperature between room temperature and about 70°C thereby to lower the viscosity of the resin;

immersing an electric coil in the mixture under vacuum, maintaining the mixture at said first temperature;

withdrawing the coil from the mixture;

heating the withdrawn coil to a second temperature higher than said first temperature and between said first temperature and about 100°C to dissolve dibenzylidene-D-sorbitol in the resin and cause the mixture attached to the coil to gel within about 1 minute;

further heating the coil at a temperature between about 80°C and about 100°C to half-cure the resin, maintaining the mixture attached to the coil in the gelled state; and heating the coil at a temperature higher than 100°C thereby to complete the curing of the resin.

5. A method as claimed in claim 4, wherein said resin and said curing agent are a bisphenol A type epoxy resin and boron trifluoride monoethylamine, respectively, the amount of said curing agent being about two parts by weight.

6. A method of impregnating and encapsulating an electric coil with a liquid thermosetting resin for enhancement of insulation and protection against external forces, comprising the steps of:

preparing a mixture of 100 parts by weight of a liquid thermosetting epoxy resin and about 5 to about 8 parts by weight of powdered dibenzylidene-D-sorbitol;

heating the mixture to about 70°C to dissolve said dibenzylidene-D-sorbitol in the resin and cause the mixture to gel;

further heating the gelled mixture to about 110°C to about 120°C to cause the gelled mixture to revert to a sol;

cooling the solated mixture to about 80°C to about 90°C;

mixing a curing agent for the resin with the mixture, said curing agent being capable of curing the resin at a temperature range between about 100°C and about 200°C; immersing an electric coil in the mixture under vacuum;

withdrawing the coil from the solated mixture;

cooling the withdrawn coil to about 50°C to cause the mixture impregnating and covering the coil to turn into a gel;

heating the coil at about 100°C to half-cure the resin while maintaining the mixture attached to the coil in the gelled state; and heating the coil at a temperature higher than 100°C thereby to complete the curing of the resin.

7. A method as claimed in claim 6, wherein said resin and said curing agent are a bisphenol A type epoxy resin and boron trifluoride menoethylamine, respectively, the amount of said curing agent being about 2 parts by weight.

8. A method as claimed in claim 6, wherein said resin and said curing agent are a bisphenol A type epoxy resin and 2-ethyl-4-methyl imidazole, respectively, the amount of said curing agent being about 3 parts by weight.

* * * * *